(12) United States Patent
Bard et al.

(10) Patent No.: US 10,535,176 B2
(45) Date of Patent: Jan. 14, 2020

(54) ANIMATION TECHNIQUES FOR MOBILE DEVICES

(71) Applicant: Apple Inc., Cupertino, CA (US)

(72) Inventors: Aymeric Bard, Paris (FR); Thomas Goossens, Paris (FR); Amaury Balliet, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/180,324

(22) Filed: Nov. 5, 2018

(65) Prior Publication Data

US 2019/0087997 A1    Mar. 21, 2019

Related U.S. Application Data

(63) Continuation of application No. 15/180,044, filed on Jun. 12, 2016, now Pat. No. 10,169,903.

(51) Int. Cl.
*G06T 13/40* (2011.01)
*G06T 1/60* (2006.01)

(52) U.S. Cl.
CPC ............. *G06T 13/40* (2013.01); *G06T 1/60* (2013.01); *G06T 2210/44* (2013.01)

(58) Field of Classification Search
None
See application file for complete search history.

(56) References Cited

U.S. PATENT DOCUMENTS

| 5,696,944 | A | * | 12/1997 | Krech, Jr. | ............... G06T 1/60 345/423 |
| 6,876,364 | B2 | | 4/2005 | Buddemeier | |
| 7,515,155 | B2 | * | 4/2009 | Anderson | ............... G06T 13/40 345/473 |
| 8,290,757 | B2 | * | 10/2012 | Irving | ............... G06T 13/20 703/6 |
| 8,624,901 | B2 | * | 1/2014 | Park | ............... G06T 13/40 345/419 |
| 9,990,754 | B1 | * | 6/2018 | Waterson | ............... G06T 13/40 |
| 2008/0309664 | A1 | * | 12/2008 | Zhou | ............... G06T 13/40 340/420 |
| 2009/0002376 | A1 | * | 1/2009 | Xu | ............... G06T 13/40 345/473 |

(Continued)

OTHER PUBLICATIONS

Li, Hao, Thibaut Weise, and Mark Pauly, "Example-based facial rigging," Acm transactions on graphics (tog), vol. 29, No. 4.

(Continued)

*Primary Examiner* — Ryan M Gray
(74) *Attorney, Agent, or Firm* — Blank Rome LLP

(57) ABSTRACT

Systems, methods, and computer readable media to improve the animation capabilities of a computer system are described. Animation targets may be represented as a combination of a current animation pose and an incremental morph. The incremental morph may be represented as a series of non-zero weights, where each weight alters one of a predetermined number of target poses. Each target pose may be represented as a weighted difference with respect to a reference pose. Target poses may be stored in memory in a unique and beneficial manner. The disclosed manner permits the efficient retrieval of pose vertex data at run-time and may be especially efficient in systems that do not use, or have very little, cache memory.

20 Claims, 6 Drawing Sheets

(56) References Cited

U.S. PATENT DOCUMENTS

| | | | | |
|---|---|---|---|---|
| 2009/0284529 A1* | 11/2009 | De Aguiar | ............... | G06T 13/40 345/420 |
| 2010/0007665 A1* | 1/2010 | Smith | ...................... | G06T 13/40 345/473 |
| 2010/0033488 A1* | 2/2010 | Zhou | ........................ | G06T 13/40 345/473 |
| 2010/0149179 A1* | 6/2010 | de Aguiar | ................ | G06T 9/00 345/420 |
| 2011/0304622 A1* | 12/2011 | Rogers | .................... | G06T 13/40 345/420 |
| 2013/0211586 A1* | 8/2013 | Lee | ...................... | B62D 57/032 700/245 |
| 2013/0222433 A1* | 8/2013 | Chapman | ................ | G06T 13/40 345/660 |
| 2015/0029198 A1* | 1/2015 | Sumner | ................... | G06T 13/20 345/474 |
| 2015/0221119 A1* | 8/2015 | Gornowicz | ............. | G06F 17/12 345/474 |
| 2015/0339850 A1* | 11/2015 | Utsugi | .................... | G06T 13/40 345/420 |
| 2017/0032560 A1* | 2/2017 | Dionne | ................... | G06T 13/40 |
| 2017/0032579 A1* | 2/2017 | Eisemann | ............... | G06T 13/40 |

OTHER PUBLICATIONS

Seol, Yeongho, et al., "Weighted pose space editing for facial animation," The Visual Computer 28.3 (2012): 319-327.

* cited by examiner

ANIMATION TECHNIQUES FOR MOBILE DEVICES

BACKGROUND

This disclosure relates generally to digital animation. More particularly, but not by way of limitation, this disclosure relates to techniques for providing animation capability to a system with restricted cache memory.

A polygon mesh is a collection of vertices, edges and faces that define the shape of a polyhedral object in three-dimensional (3D) computer graphics and solid modeling. polyhedral faces often consist of triangles (triangle mesh), quadrilaterals, or other simple convex polygons since this simplifies rendering, but may also be composed of more general concave polygons, or polygons with holes. A vertex is a position and, possibly, other information such as color, a normal vector and texture coordinates. An edge is a connection between two vertices. A face is a closed set of edges in which a triangle face has three edges, and a quad has four edges and so on. A polygon is a coplanar set of faces.

Mathematically a polygonal mesh may be considered an unstructured grid, or undirected graph with the additional properties of geometry, shape and topology. Polygonal meshes may be represented in a variety of ways, using different methods to store the vertex, edge and face data. Illustrative representational schemes include:

1. Face-vertex meshes: a simple list of vertices, and a set of polygons that point to the vertices it uses;
2. Winged-edge meshes, in which each edge points to two vertices, two faces, and the four (clockwise and counter clockwise) edges that touch them;
3. Half-edge meshes, are similar to winged-edge meshes except that only half the edge traversal information is recorded;
4. Quad-edge meshes, store edges, half-edges, and vertices without any reference to polygons which are implicit in the representation, and may be found by traversing the structure;
5. Corner-tables, store vertices in a predefined table such that traversing the table implicitly defines polygons; and
6. Vertex-vertex meshes represents only vertices, which point to other vertices (both the edge and face information is implicit in the representation).

Three-dimensional mesh sequences may be used to represent animations in the form of deforming meshes. Deformation transfer (DT) and animation warping are two typical techniques used to recreate meaningful mesh animations from a given mesh sequence. Standard morphing operations generally entail morphing every vertex of a target object's mesh representation at each frame of an animation. Even small meshes may be comprised of from several thousand to more than ten-thousand vertices. In systems having limited computational power and/or limited memory, it may not be possible to perform morphing operations in a manner that provides a satisfactory user experience. For example, even small meshes can consume a large amount of memory. Consider a 10,000 vertex mesh where each vertex includes position (x, y and z values), color (R, G and B values), a normal vector (x, y and z values), and texture coordinates (e.g., an address) for a total of about 50 bytes. Such a mesh requires 500,000 bytes of memory to store for every update operation. When frame update rates are 30 frames-per-second (fps), this translates into approximately 15 MB/sec (megabytes-per-second) of memory bandwidth. When frame update rates are 60 fps, this translates into approximately 30 MB/sec of memory bandwidth. In systems that have less powerful processors (e.g., central processor units) or limited to no cache memory, these memory bandwidths may not be available.

SUMMARY

In one embodiment the disclosed concepts provide a method to display an animation sequence. The method includes identifying a current animation pose of an object (e.g., a face, head or body of a character—real or imaginary); identifying a next animation pose for the object; and determining an incremental morph based on the current animation pose, the next animation pose and a plurality of target poses, wherein the incremental morph comprises a set of weight values, each weight value associated with one of the target poses. In one embodiment, the weight values in the set of weight values may represent a weight difference associated with the corresponding target between the current and next animation poses. Once the incremental morph has been determined, the method may continue by retrieving, from a memory, a plurality of vertices for each target pose having an associated weight value in the set of weight values, wherein at least some of the target poses associated with weight values in the set of weight values are stored in the memory in a sparse mesh representation; applying, to each retrieved vertex value of a target pose, the target pose's associated weight value from the set of weight values to generate intermediate values; updating the current animation pose with the intermediate values to generate the next animation pose; and displaying the next animation pose.

In some embodiments, the sparse mesh representation of a target poses comprises a first portion of memory including a plurality of start-stop value pairs, wherein each start value identifies a first vertex in the corresponding target pose, each stop value identifies a second vertex in the corresponding target pose, each start-stop value pair is stored sequentially in the memory, and each of the plurality of start-stop value pairs is stored sequentially in the memory; and a second portion of memory including groups of sequentially stored vertex data for the corresponding target pose, each group corresponding a one of the plurality of start-stop value pairs, wherein a first of each group's vertex data corresponds to a start value of one of the start-stop value pairs and a last of the group's vertex data corresponds to the stop value of the one start-stop value pair. In some embodiments the memory comprises non-cache memory such as, for example, main memory (e.g., static or dynamic RAM).

Other embodiments of the disclosed subject matter may be implemented as computer executable program code configured or designed to cause one or more processors to perform the above method. In still other embodiments, the disclosed subject matter may be incorporated within an electronic device.

DETAILED DESCRIPTION

Figure 1:
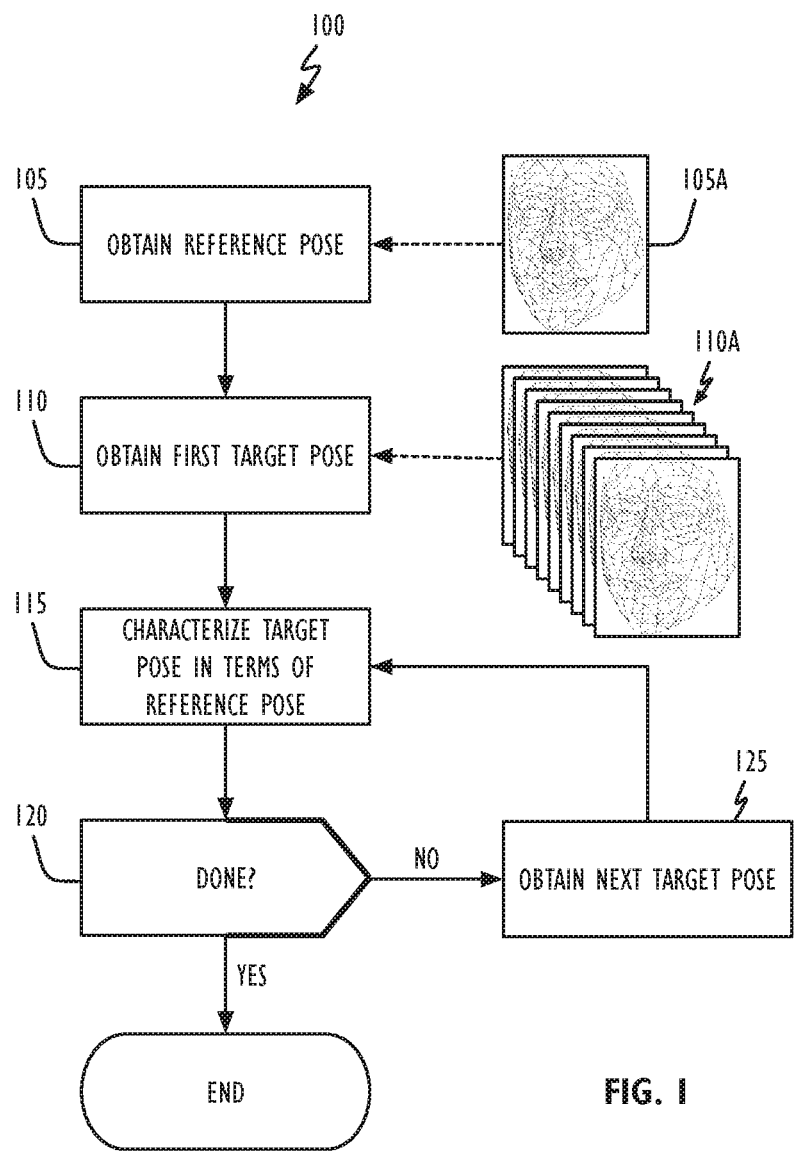
FIG. 1 shows, in flowchart form, an off-line operation in accordance with one embodiment.

This disclosure pertains to systems, methods, and computer readable media to improve the animation capabilities of a computer system. In general, techniques are disclosed for representing animation targets as a combination of a current animation pose and an incremental morph. The incremental morph, in turn, may be represented as a series of non-zero weights, where each weight alters one of a predetermined number of target poses. Each target pose, in turn, may be represented as a weighted difference of a reference pose. Techniques are further disclosed for storing each of the predetermined number of target poses in memory in a sparse manner. Each target pose may be stored in memory as a collection of two elements. The first element may be a series of start-stop value pairs in which the start value represents a first (lower number) mesh vertex and the stop value represents a second (higher number) mesh vertex where each vertex between the start and stop values has a different (non-zero) value with respect to a reference pose. (The only assumption necessary being each vertex in a mesh be identified by a numeric label or identifier, ant that these identifiers a fixed and consistent across the target poses/meshes.) The second element may include memory in which the mesh vertices making up each series of start-stop value pairs are consecutively stored. In this manner memory access to each series of a target pose's vertices proceed in a sequential manner—an especially efficient approach when the processor has limited cache memory.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

In one embodiment, the disclosed animation technology may be applied in a two-phase operation. The first phase may typically be applied offline before real-time or run-time animations are created. One goal of this first phase is to generate a number of memory efficient target pose representations. The second phase may then use the memory efficient representations prepared during the first phase to smoothly animate the transition from a first animation pose to a second animation pose during run-time or real-time operations. The disclosed techniques may be especially useful for systems that have limited processing capacity and/or limited memory and, in particular, limited to no cache memory. Animation techniques that morph every vertex of a target object's mesh representation at each frame of an animation require systems that do not incorporate cache to make a full or standard memory access for each vertex in a mesh for each displayed frame. Without cache, it may not be possible to animate many structures at a rate sufficient to provide a pleasant user experience without use of the disclosed techniques.

Referring to FIG. 1, phase 1 operation 100 in accordance with one embodiment may begin by obtaining a mesh representation of a reference pose of the target object (block 105). By way of example, let the target object be a face; that is, reference pose 105A of a face. Reference pose 105A may then be a "neutral" face with eyes open and mouth in a relaxed natural position. With reference pose 105A known, a first pose from a collection of target poses 110A may be obtained (block 110). Poses 110A could, for example, include a "smiling face" pose, an "angry face" pose, a "sleepy eyed" pose, a "surprised face" pose and the like. The obtained first pose may then be characterized in terms of reference pose 105A (block 115).

Figures 2A, 2B:
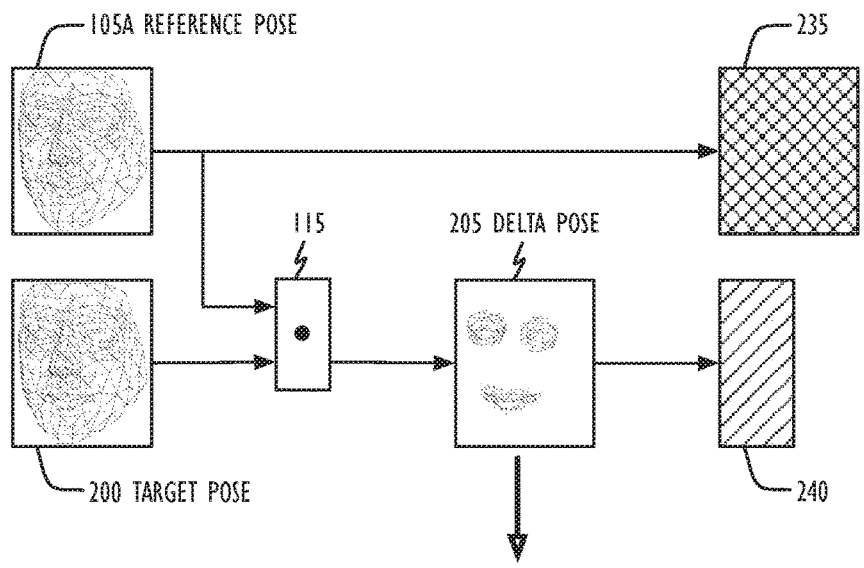
FIGS. 2A-2C show a target pose characterization operation in accordance with one embodiment.
Figure 2C:
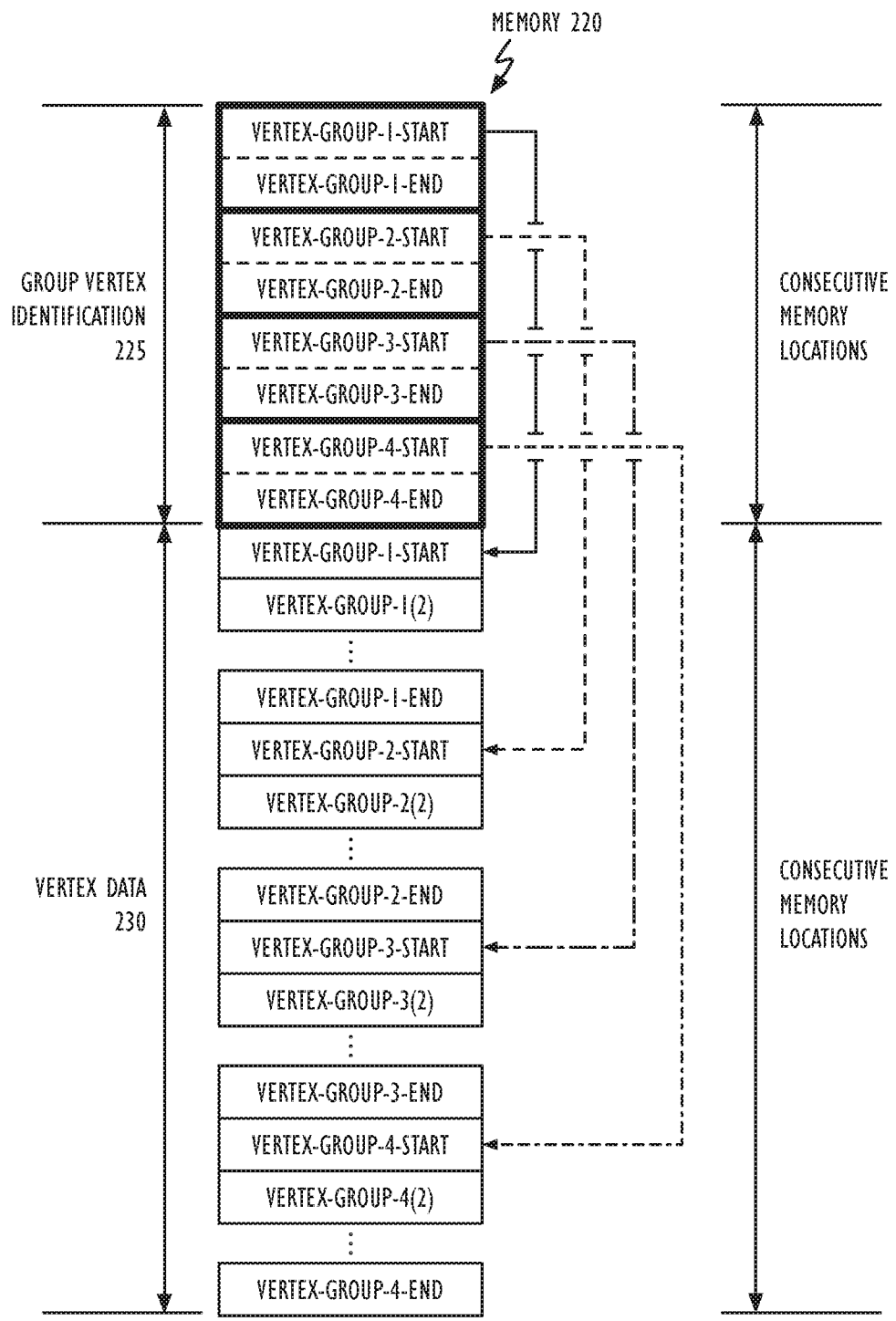

Referring to FIG. 2A, in one embodiment target pose characterization operation 115 identifies vertices in the selected target pose 200 that are different from the corresponding vertices in reference pose 105A to generate delta pose 205. Referring now to FIG. 2B, if each of reference pose 105A and target pose 200 have Y vertices, delta pose 205 could be enumerated vertex-by-vertex as shown by element 210. When this is done it may be seen that some consecutive groups of vertices may have zero values (i.e., corresponding vertices in target pose 200 and reference pose 105A have the substantially the same value), and some are non-zero (i.e., corresponding vertices in target pose 200 and reference pose 105A have different values). In one embodiment, a vertex in delta pose 205 may be determined to be zero if it has a value that is less than a first specified threshold. In some embodiments, the first specified threshold may be a fraction of a vertex's range of values. That is, if a vertex's value may range from 0.0 to 1.0, the first specified threshold may be 5% of that range. In other embodiments, the first specified threshold may be a fixed value. In general, it has been found that the thresholds are important tuning parameters and depend on the scale of the meshes being used. As such, specific values are highly implementation specific. In one embodiment, consecutive runs of vertices less than a second specified threshold in length may be ignored. By example: if vertex-1 through vertex-N are non-zero; vertex-(N+1) is zero; and vertex-(N+2) through vertex-(N+X) are non-zero (where X is some positive integer), the zero value of vertex-(N+1) may be ignored and the two groups of non-zero valued vertices combined if the second specified threshold is 1 or more. In this way the second specified threshold may be used to specify the maximum number of vertices that may be different from surrounding groups of vertices to be ignored. Thus, the second specified threshold may be used to consolidate larger groups of zero (or non-zero) valued vertices separated by relatively a small number of non-zero (or zero) valued vertices. Referring again to FIG. 2B, delta pose 205 may be seen to consist of 8 groups of consecutive vertices that are either zero (210A-210D) or non-zero (215A-215D). It should be understood that the example portrayed in FIG. 2 is illustrative only. A real delta pose may consist of more or fewer groups of vertices. The number of vertices in each group is, of course, determined by the specific target and reference poses. When characterization operation 110 is akin to the difference operator described herein, the "closer" or "more similar" the reference and target poses, the delta pose will include fewer non-zero vertices. Referring to FIG. 2C, in one embodiment delta pose 205 may be stored as a sparse mesh in memory 220 as a collection of vertex identification information 225 followed by a collection of vertex data 230, were each consecutive group of non-zero valued vertices may be specified by a start vertex and a stop or end vertex (e.g., vertex identifiers). In one embodiment, each group's start vertex may point to a later memory location storing the identified vertex's vertex data. In another embodiment, rather than a pointer, the group's start vertex may be represented by a value indicative of the number of memory locations between the start vertex identifier (i.e., in the group vertex identification information 225) and the corresponding vertex data. The same mapping may be applied to each group's end vertex identifier. For memory retrieval operations during run-time in systems that have limited or no cache, it may be time efficient to store each group identifier in consecutive memory followed immediately (in memory) by the corresponding vertex data. In this manner, the processor accessing a pose's memory may simply make a number of consecutive memory accesses—action that is faster than first calculating and then making random jumps into memory. Returning now to FIG. 2A, if reference pose 205A is seen as requiring memory quantity 235, delta pose 205 may need only memory quantity 240. While not to scale, the difference in the amount of memory needed to store reference pose 105A and a target pose should be evident in light of the above description. This description also suggests that in the illustrated embodiment the more "similar" the reference and target poses are, the less memory may be required to store the target pose's corresponding delta pose data. (Where "similar" is defined in accordance with characterization operation 110.) It should be noted that memory storage as described by FIG. 2 is most useful during animation operations. By its very nature, off-line operation 100 need not be as concerned with memory retrieval operations as it is not intended to provide real-time animation. The discussion here is provided with the foreknowledge that real-time operations will be described later.

Returning to FIG. 1, once the current target pose has been characterized in accordance with block 115 a test may be made to determine if additional target poses remain to be characterized (block 120). If at least one target poses remains to be processed (the "NO" prong of block 120), the next target pose may be selected (block 125), where after phase 1 operation 100 resumes at block 115. If all target poses have been processed (the "YES" prong of block 120), phase 1 operation 100 has completed. In an extremely coarse implementation, the number of poses may be as low as two. For faithful representation of a human face, it has been found that the number of poses are around the hundreds of poses.

Figure 3:
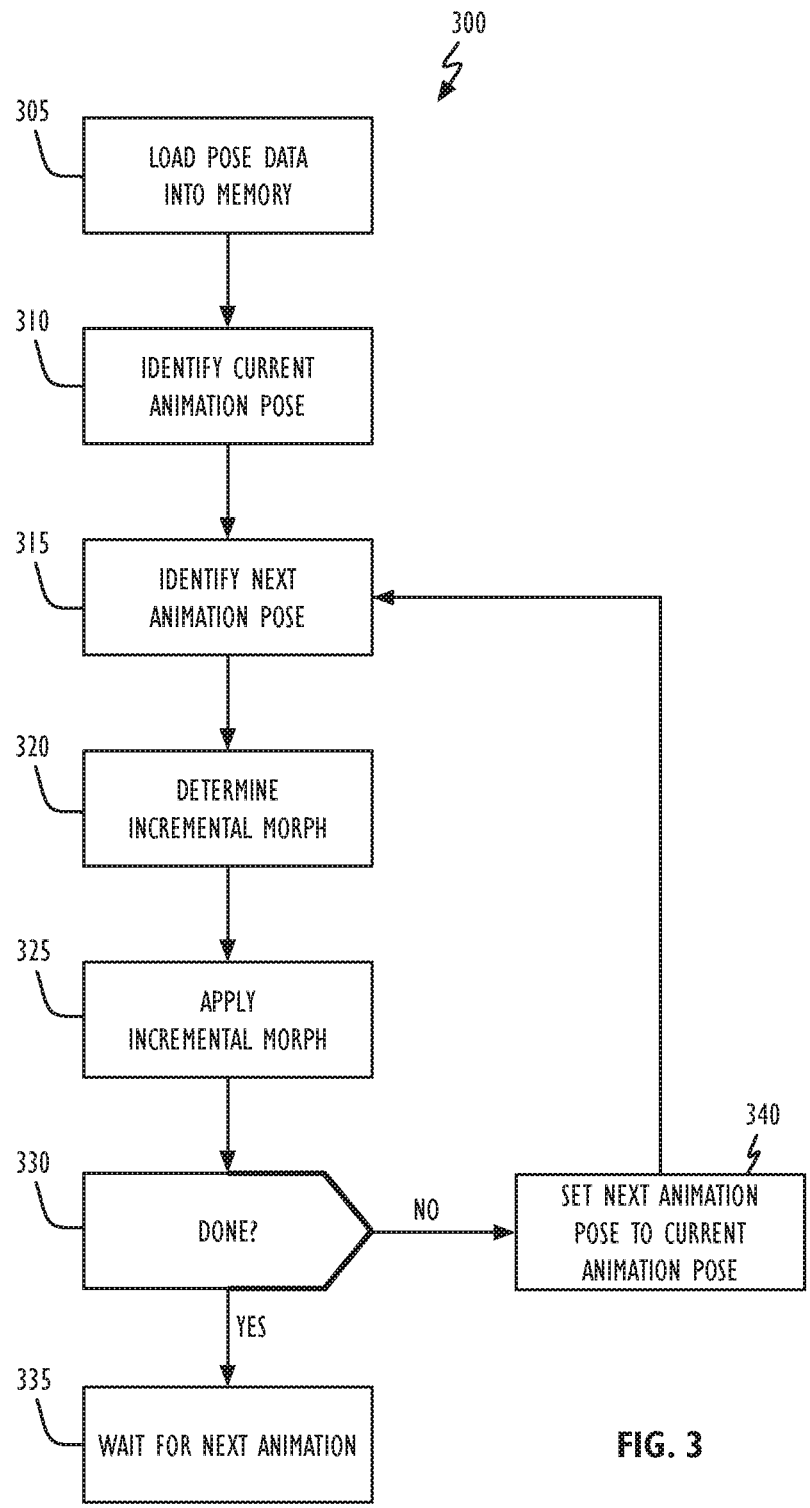
FIG. 3 shows, in flowchart form, a run-time animation operation in accordance with one embodiment.

Referring to FIG. 3, following characterization of a animation's target poses (e.g., phase 1 operation 100), run-time animation operation 300 may be initiated. At first, the poses—in their memory efficient form—may be loaded into memory (block 305). Once loaded, current and next animation poses may be determined (blocks 310 and 315 respectively). In accordance with this disclosure, morphing operations (e.g., the animated transition from the current animation pose to the next animation pose) may be optimized it at least two ways: (1) use of incremental morphing; and (2) use of sparse morph targets. In incremental morphing, each animation pose (i.e., in a given frame) may be represented as a linear combination of a number of predetermined target poses. By way of example, let there be 100 predetermined target poses ($P_1$ to $P_{100}$) so that any given animation pose may be represented by:

$$\text{Animation\_Pose} = \text{Ref\_Pose} + (w_1 \times P_1) + \ldots + (w_{100} \times P_{100}), \quad \text{EQ. 1}$$

where Ref_Pose denotes a mesh representation of a neutral target object (e.g., a face, head or body such as reference pose 105A), each target pose denotes a mesh representation of a predetermined pose of, for example, a face, head, torso or complete body (consistent with the reference pose), and $w_i$ denotes and i-th weight value associated with the i-th target pose. In one embodiment, weight values may range from 0.0 to 1.0. Thus, if the Animation_Pose is equal to the 57th target pose ($P_{57}$), this could be represented by:

$$\text{Animation\_Pose} = \text{Ref\_Pose} + (0)P_1 + \ldots + (0)P_{56} + (1)P_{57} + (0)P_{58} + \ldots + (0)P_{100}. \quad \text{EQ. 2}$$

In one embodiment, only the weight factors associated with a change from one animation frame to another need be determined. For example, if the animation pose of the i-th frame of an animation may be represented by $$\text{Animation\_Pose}_i = \text{Ref\_Pose} + w_1 P_1 + w_2 P_2 + \ldots + w_{100} P_{100}, \quad \text{EQ. 3}$$

and only the weights associated with the 1st, 56th and 100th target poses changed in the next (ith+1) frame, then only the change in those weights need be determined. That is, if $$\text{Animation\_Pose}_{i+1} = \text{Animation\_Pose}_i + \Delta w_1 P_1 + \Delta w_{56} P_{56} + \Delta w_{100} P_{100}, \quad \text{EQ. 4}$$

then only $\Delta w_1$, $\Delta w_{56}$ and $\Delta w_{100}$ need be calculated during generation of the i-th+1 frame. In accordance with this disclosure, the values corresponding to $\Delta w_1$, $\Delta w_{56}$ and $\Delta w_{100}$ may be referred to as the current frame's "incremental morph" value (block 320). To be more specific, the incremental morph of EQ. 4 may be represented by $\Delta w_1 = (w_1^{i+1} - w_1^i)$; $\Delta w_{56} = (w_{56}^{i+1} + w_{56}^i)$; and $\Delta w_{100} = (w_{100}^{i-1} - w_{100}^i)$, where $w_x^y$ represents the value of the x-th weight in the y-th animation frame. An incremental morph is the representational analogue to the sparse mesh representation and storage scheme discussed above with respect to FIG. 2. That is, in one embodiment an incremental morph identifies only those pose weights that have changed between two animation poses.

Returning to FIG. 3, once determined the incremental morph may be applied to the current animation pose so as to generate the next animation pose (block 325). A check may then be made to determine if the animation sequence is complete (block 330). If the current sequence is complete (the "YES" prong of block 330), a wait may be initiated for the next animation sequence to begin (block 335). If the current sequence is not yet complete (the "NO" prong of block 330), the just created next animation may be set to the current animation pose (block 340), where after run-time operation 300 resumes at block 315.

Figure 4:
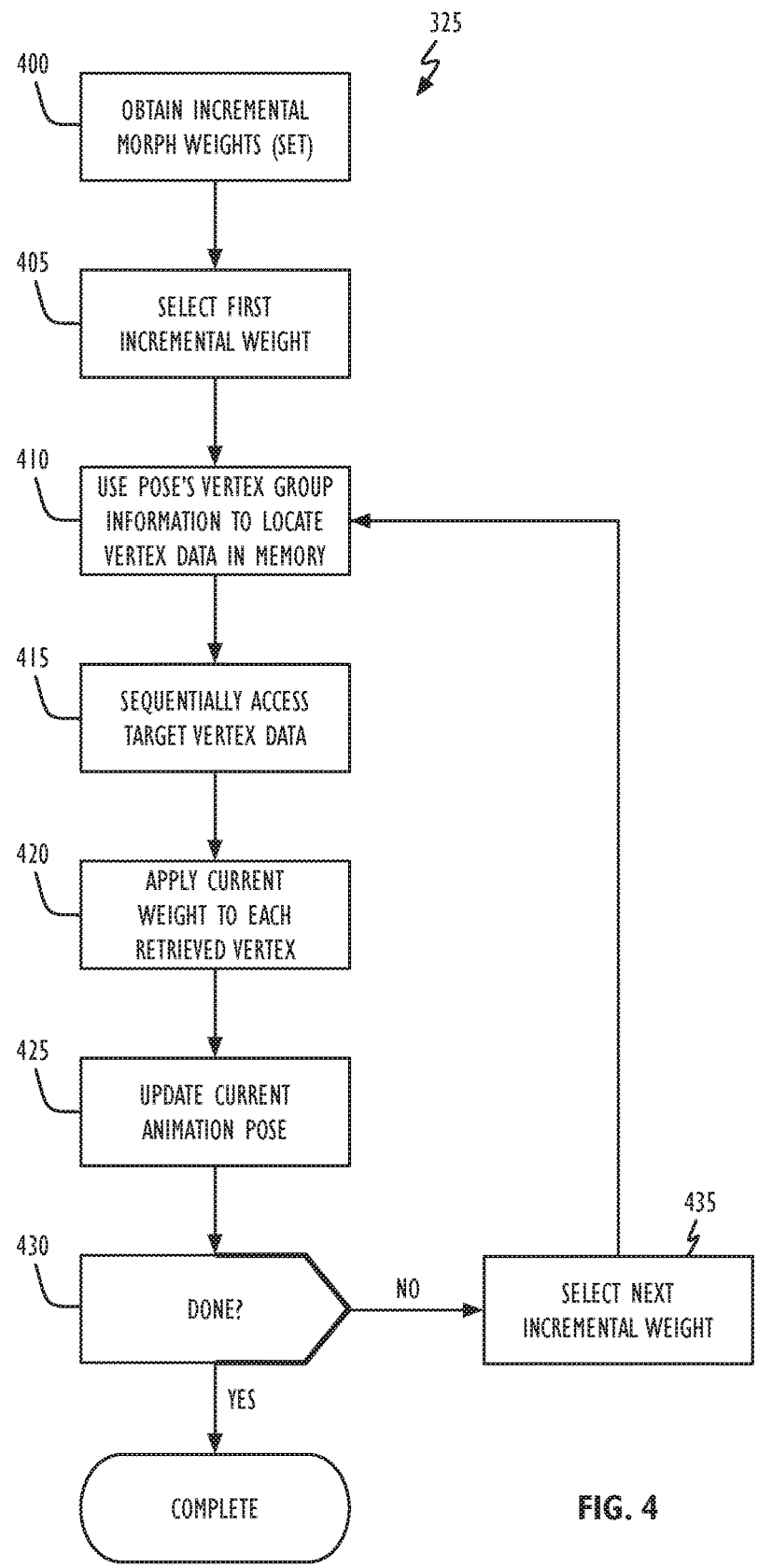
FIG. 4 shows, in flowchart form, an incremental morph operation in accordance with one embodiment.

Referring now to FIG. 4, incremental morph application operation 325 in accordance with one embodiment may begin by obtaining the next frame's incremental morph weights, e.g., the weight set consisting of $\{\Delta w_1, \Delta w_{56}, \Delta w_{100}\}$ (block 400). From this set of incremental morph weights, a first weight may be selected (block 405) and the corresponding target pose's vertex data located (block 410). In accordance with the sequential storage of sparse mesh data described earlier, the target pose's vertex data may be retrieved from memory sequentially (block 415) with the selected weight applied to each retrieved vertex value (block 420) where after the current frame's corresponding vertex value may be updated (block 425). If all weights in the current incremental morph set have been processed (the "YES" prong of block 430), the current animation pose has been updated to reflect the next animation pose. If at least one weight from the incremental morph set has not yet been processed (the "NO" prong of block 430), the next weight from the set of weights may be selected (block 435) so that operation 325 may continue at block 410.

Figure 5:
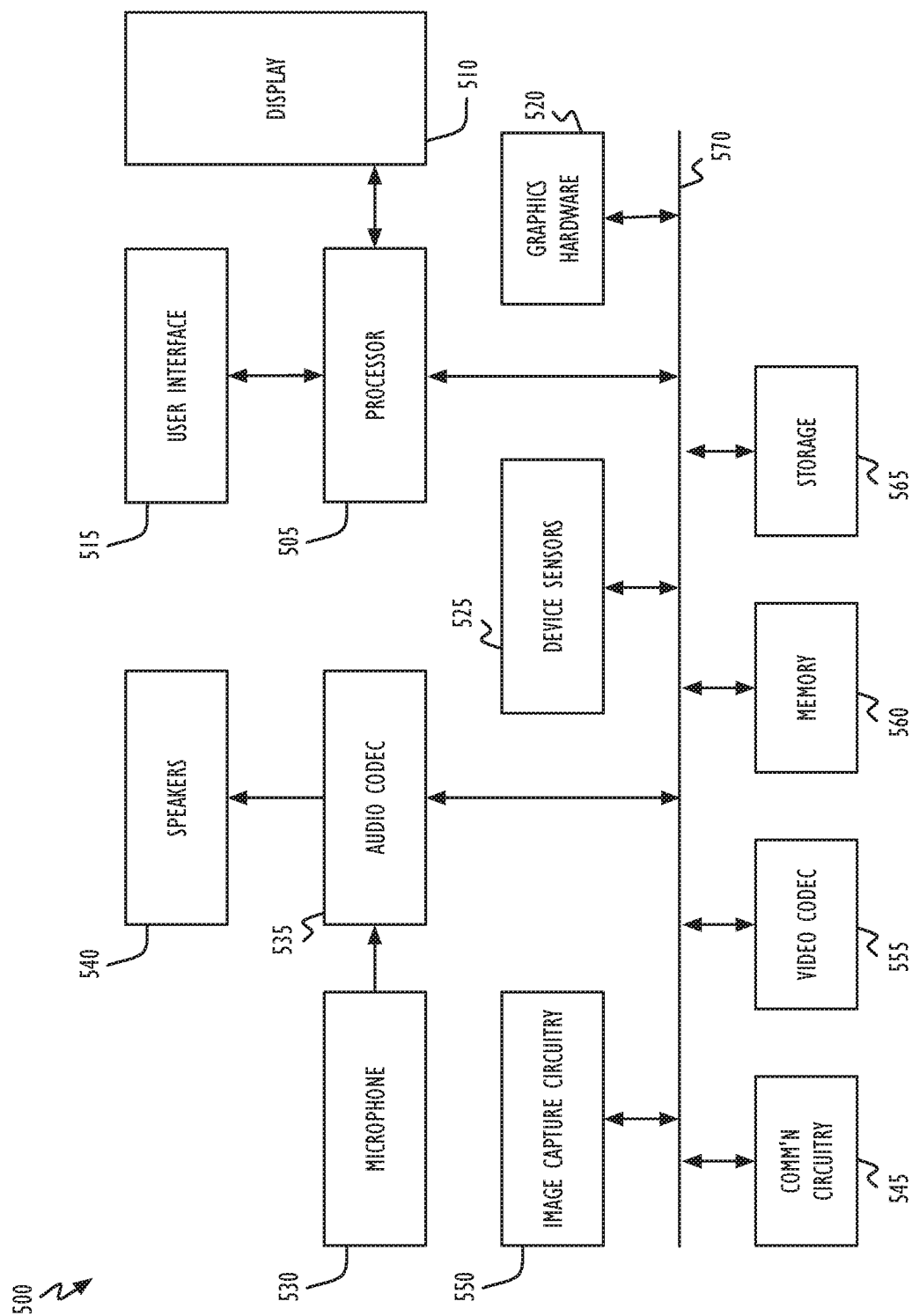
FIG. 5 shows, in block diagram form, a multi-function electronic device in accordance with one embodiment.

Referring to FIG. 5, a simplified functional block diagram of illustrative electronic device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, image capture circuit or unit 550, video codec(s) 555, memory 560, storage 565, and communications bus 570.

Processor 505 may execute instructions necessary to carry out or control the operation of many functions performed by device 500 (e.g., such as generating animation sequences in accordance with FIGS. 1-4). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may initiate the generation and presentation of an animation sequence in accordance with FIG. 3. Processor 505 may be a system-on-chip and include zero or more dedicated graphics processing units (GPUs). Alternatively, processor 505 may be a single or multi-core central processing unit (CPU) with or without cache memory. Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs). In some electronic devices such as some portable devices (e.g., electronic watches and the like), GPUs are either not incorporated or not available to an operating or controlling CPU.

Image capture circuitry 550 may capture still and video images that may be processed to generate images and video. Output from image capture circuitry 550 may be processed, at least in part, by video codec(s) 555 and/or processor 505 and/or graphics hardware 520, and/or a dedicated image processing unit incorporated within circuitry 550. Images so captured may be stored in memory 560 and/or storage 565. It will be recognized, some electronic devices do not provide for image (or video) capture and may thus lack image capture circuitry 550. Memory 560 may include one or more different types of media used by processor 505, graphics hardware 520, and image capture circuitry 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. In some electronic devices, processor 505 may not have access to cache memory. When this is true, many if not most CPU-based operations require a direct memory access. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, FIGS. 1, 3 and 4 show flowcharts illustrating different aspects of the disclosed subject matter. In one or more embodiments, one or more of the disclosed blocks may be omitted, repeated, and/or performed in a different order than that described herein. Accordingly, the specific arrangement of the blocks or actions shown in these figures should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An animation method, comprising:
   obtaining a mesh representation of a reference pose of a target object;
   obtaining a mesh representation of a target pose corresponding to the reference pose;
   generating a mesh representation of a delta pose based on the target pose and the reference pose, wherein the delta pose identifies a plurality of vertices of the target pose whose values are different from values of corresponding vertices in the reference pose; and
   storing, in memory and with a sparse mesh representation, the delta pose as a collection of vertex identification information, and a collection of vertex data, wherein the collection of vertex identification information includes one or more start-stop value pairs, the start value identifying a first vertex of a consecutive vertex group in the delta pose, and the stop value identifying a last vertex of the consecutive vertex group in the delta pose, and wherein the collection of vertex data includes, for each of the one or more start-stop value pairs, a series of vertex data stored for each vertex from the first vertex to the last vertex of the consecutive vertex group.

2. The animation method according to claim 1, further comprising animating smoothly, a transition from a first animation pose to a second animation pose during run-time, based on the stored delta pose.

3. The animation method according to claim 1, wherein the target pose includes a plurality of target poses, and wherein the generating, and the storing, comprises:
generating a corresponding mesh representation of a corresponding delta pose of each of the plurality of target poses; and
storing the corresponding delta pose of each of the plurality of target poses in the memory with the sparse mesh representation.

4. The animation method according to claim 1, wherein for each consecutive vertex group in the delta pose, the first vertex represents a first mesh vertex number and the last vertex represents a second mesh vertex number which is higher than the first mesh vertex number, and wherein each of a plurality of vertices between the first and last vertices has a value that is different from a corresponding value of a corresponding vertex in the reference pose by at least a first specified threshold.

5. The animation method according to claim 4, wherein each consecutive vertex group includes a group of consecutively numbered vertices of the mesh representation of the target pose.

6. The animation method according to claim 4, wherein each of a predetermined consecutive number of vertices between the first and last vertices of the consecutive vertex group has a value that is not different from the corresponding value of the corresponding vertex in the reference pose by at least the first specified threshold.

7. The animation method according to claim 6, wherein a number of the predetermined consecutive number of vertices is lower than a number specified by a second specified threshold.

8. The animation method according to claim 1, wherein for each of the one or more start-stop value pairs, the start value is a pointer value that points to a memory location where vertex data of the first vertex of the consecutive vertex group is stored, and the stop value is a pointer value that points to a memory location where vertex data of the last vertex of the consecutive vertex group is stored.

9. The animation method according to claim 1, wherein for each of the one or more start-stop value pairs, the series of vertex data is stored in the memory in consecutive memory locations for each vertex from the first vertex to the last vertex of the consecutive vertex group.

10. The animation method according to claim 9, wherein each of the one or more start-stop value pairs are stored in consecutive memory locations in the memory.

11. The animation method according to claim 10, wherein the one or more start-stop value pairs, and the series of vertex data for the one or more start-stop value pairs are stored in consecutive memory locations in the memory.

12. A non-transitory program storage device comprising instructions stored thereon to cause one or more processors to:
obtain a mesh representation of a reference pose of a target object;
obtain a mesh representation of a target pose corresponding to the reference pose;
generate a mesh representation of a delta pose based on the target pose and the reference pose, wherein the delta pose identifies a plurality of vertices of the target pose whose values are different from values of corresponding vertices in the reference pose; and
store, in memory and with a sparse mesh representation, the delta pose as a collection of vertex identification information, and a collection of vertex data, wherein the collection of vertex identification information includes one or more start-stop value pairs, the start value identifying a first vertex of a consecutive vertex group in the delta pose, and the stop value identifying a last vertex of the consecutive vertex group in the delta pose, and wherein the collection of vertex data includes, for each of the one or more start-stop value pairs, a series of vertex data stored for each vertex from the first vertex to the last vertex of the consecutive vertex group.

13. The non-transitory program storage device according to claim 12, wherein the instructions further cause the one or more processors to animate smoothly, a transition from a first animation pose to a second animation pose during run-time, based on the stored delta pose.

14. The non-transitory program storage device according to claim 12, wherein the target pose includes a plurality of target poses, and wherein the instructions to cause the one or more processors to generate, and to store, further comprise instructions to cause the one or more processors to:
generate a corresponding mesh representation of a corresponding delta pose of each of the plurality of target poses; and
store the corresponding delta pose of each of the plurality of target poses in the memory with the sparse mesh representation.

15. The non-transitory program storage device according to claim 12, wherein for each consecutive vertex group in the delta pose, the first vertex represents a first mesh vertex number and the last vertex represents a second mesh vertex number which is higher than the first mesh vertex number, and wherein each of a plurality of vertices between the first and last vertices has a value that is different from a corresponding value of a corresponding vertex in the reference pose by at least a first specified threshold.

16. The non-transitory program storage device according to claim 15, wherein each consecutive vertex group includes a group of consecutively numbered vertices of the mesh representation of the target pose.

17. The non-transitory program storage device according to claim 15, wherein each of a predetermined consecutive number of vertices between the first and last vertices of the consecutive vertex group has a value that is not different from the corresponding value of the corresponding vertex in the reference pose by at least the first specified threshold.

18. The non-transitory program storage device according to claim 17, wherein a number of the predetermined consecutive number of vertices is lower than a number specified by a second specified threshold.

19. An electronic device, comprising:
a display unit;
a non-cache memory operatively coupled to the display unit; and
one or more processors configured to execute program instructions stored in the non-cache memory, the instructions configured to cause the one or more processors to:
obtain a mesh representation of a reference pose of a target object;
obtain a mesh representation of a target pose corresponding to the reference pose;
generate a mesh representation of a delta pose based on the target pose and the reference pose, wherein the delta pose identifies a plurality of vertices of the target pose whose values are different from values of corresponding vertices in the reference pose; and store, in the non-cache memory and with a sparse mesh representation, the delta pose as a collection of vertex identification information, and a collection of vertex data, wherein the collection of vertex identification information includes one or more start-stop value pairs, the start value identifying a first vertex of a consecutive vertex group in the delta pose, and the stop value identifying a last vertex of the consecutive vertex group in the delta pose, and wherein the collection of vertex data includes, for each of the one or more start-stop value pairs, a series of vertex data stored for each vertex from the first vertex to the last vertex of the consecutive vertex group.

20. The electronic device according to claim 19, wherein the one or more processors are further configured to execute program instructions stored in the non-cache memory to cause the one or more processors to animate smoothly, a transition from a first animation pose to a second animation pose during run-time, based on the stored delta pose.

\* \* \* \* \*